Figure 1:
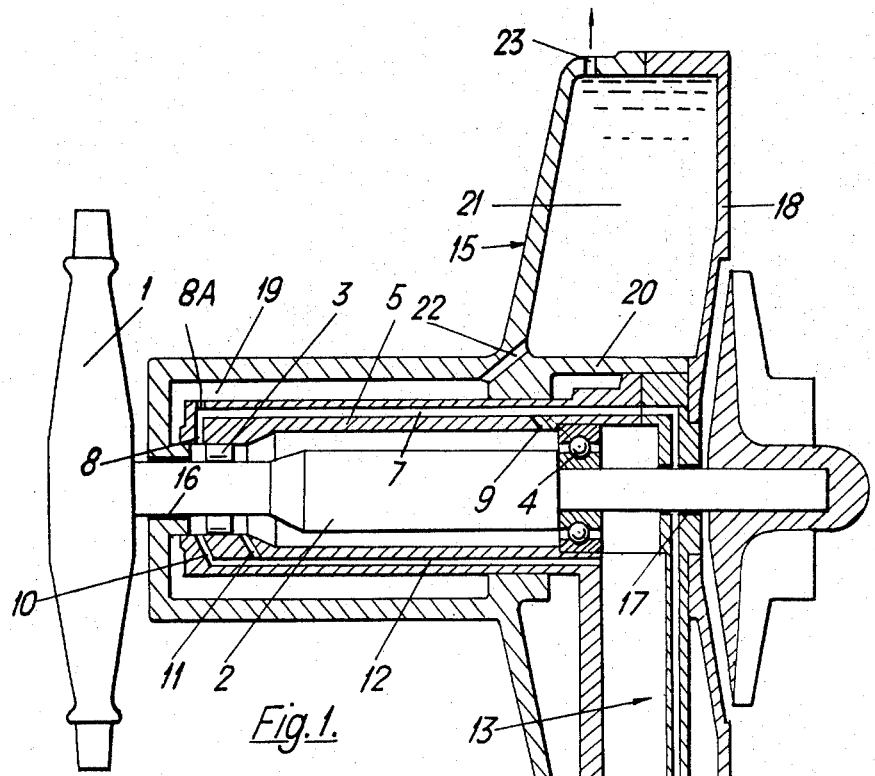

United States Patent
Butler

[15] 3,692,146
[45] Sept. 19, 1972

[54] GAS TURBINE WITH BEARING COOLING MEANS

[72] Inventor: Lawrence Butler, Solihull, England

[73] Assignee: Leyland Gas Turbines Limited, Solihull, England

[22] Filed: Feb. 8, 1971

[21] Appl. No.: 113,314

[52] U.S. Cl. .................. 184/6.1, 184/6.4, 184/6.11
[51] Int. Cl. ............................................. F16n 7/02
[58] Field of Search..... 184/6.11, 6.4, 6.12, 6.1, 6.16, 184/6 R, 6.3; 60/39.08; 415/87, 88, 89

[56] References Cited

UNITED STATES PATENTS

| 2,854,296 | 9/1958 | Eberle et al............184/6.1 X |
| 3,589,471 | 6/1971 | Edge.........................184/6.11 |

FOREIGN PATENTS OR APPLICATIONS

| 1,047,820 | 12/1958 | Germany...................184/6.12 |
| 658,044 | 10/1951 | Great Britain............184/6.11 |
| 740,513 | 11/1955 | Great Britain..............184/6.3 |

Primary Examiner—Manuel A. Antonakas
Attorney—Holcombe, Wetherill & Brisebois

[57] ABSTRACT

A regenerative gas turbine engine in which each of the turbine shaft bearings is supported in a housing which forms part of a lubricating system and which has oilways leading to and from the corresponding bearing. Surmounting the bearing housing is an oil reservoir which, during running of the engine, becomes filled with oil bled from one of the oilways of the bearing housing. The reservoir has at its top an overflow hole through which surplus oil is returned to a sump and, when the engine is shut down, the oil stored in the reservoir is exploited to cool the shaft bearings.

4 Claims, 2 Drawing Figures

PATENTED SEP 19 1972       3,692,146

GAS TURBINE WITH BEARING COOLING MEANS

This invention relates to gas turbine engines of the regenerative kind, namely, having a heat-exchanger and a thermally-insulated main casing.

In regenerative gas turbine engines, heat supplied to the nozzles and turbine rotors during running is not readily conducted to atmosphere on shut down, and can cause overheating of the bearings under these conditions, when the supply of cooling oil (from the engine's lubricating system) to the bearings normally ceases.

The object of the invention is to make provision for ensuring that a reserve of cooling oil is available to extract heat from the bearings for a sufficient period after the engine is shut down, in order to prevent overheating of the bearings by the heat which soaks back from the hotter parts of the engine. To this end, according to the invention a regenerative gas turbine engine has each of its turbine shaft bearings supported in a housing which forms part of a lubricating system and which has oilways leading to and from the corresponding bearing; surmounting the bearing housing is an oil reservoir which, during running of the engine, becomes filled with oil bled from one of the oilways of the bearing housing; the reservoir has at its top an overflow hole through which surplus oil is returned to a sump; and, when the engine is shut down, the oil stored in the reservoir is exploited to cool the shaft bearings.

Figure 2:
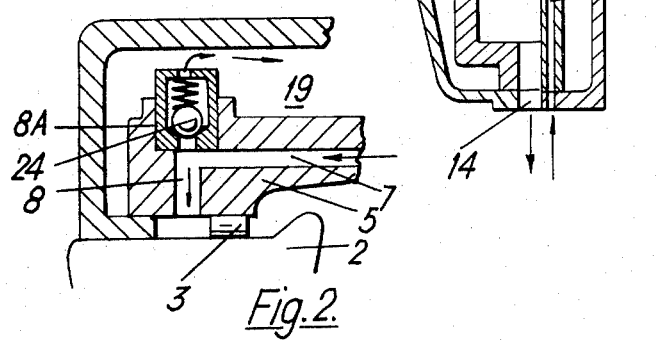

Referring to the accompanying drawings:

FIG. 1 is a sectional elevation of the turbine shaft bearings of a regenerative gas turbine engine which incorporates the invention; and FIG. 2 is a fragmentary view, to a larger scale, illustrating an alternative embodiment of the invention.

In the embodiment shown in FIG. 1, a turbine rotor 1 of a regenerative gas turbine engine has its shaft 2 mounted in bearings 3 and 4 which are supported in a housing 5. When the engine is running, the bearings 3 and 4 are supplied with oil under pressure from the usual engine-driven lubricating pump (not shown). The oil from the pump flows through oilways 6 and 7, and reaches the bearings 3 and 4 through drillings 8 and 9 in the upper part of the bearing housing 5. Further drillings 10 and 11 in the lower part of the bearing housing 5 allow the oil to drain through an oilway 12 to an auxiliary gearbox 13 suspended beneath one end of the bearing housing 5, and thence through an outlet 14 to the engine oil sump.

Surrounding the bearing housing 5 and the auxiliary gearbox 13 is a stepped cylindrical casting 15 which, at the smaller end, houses an oil seal 16 between the bearing 3 (which is a roller bearing) and the turbine rotor 1. The turbine shaft 2 has another oil seal 17 located beyond the bearing 4. A closing member 18 at the larger end of the stepped casting 15 forms a back-plate for the compressor and diffuser (which are not shown). An annular space 19 between the inner diameter of the smaller end of the stepped casting 15 and the outer diameter of the bearing housing 5 is fed with oil through an extension 8A of the bearing oil supply drilling 8. The upper part of the larger end of the stepped casting 15 is separated from the remainder by a substantially horizontal chordal wall 20 to form an oil reservoir 21 which, at its base, is fed by a drilling 22 from the annular space 19. There is an overflow hole 23 at the top of the reservoir 21 through which surplus oil can return to the sump.

When the engine is running, there is a continuous supply of oil to the bearings 3 and 4, and, in addition, first the annular space 19 is filled with oil and then the reservoir 21. When the engine is stopped, oil from the reservoir 21 flows by gravity through the bearing housing 5 and the bearings 3 and 4, and drains back to the sump. In this way the reserve oil supply continues to cool the bearings 3 and 4 after the engine is shut down.

In the alternative embodiment of the invention (see FIG. 2) a spring-loaded non-return valve 24 is fitted in the oil supply drilling 8A to the annular space 19, and the drilling 22 (FIG. 1) between the annular space and base of the reservoir 21 is enlarged. The oil does not then drain back through the bearings on shut down, but remains in the reservoir 21. Since this oil is heated at the bottom by the bearing housing 5 and is relatively cool at the top, which is adjacent to the diffuser, the oil circulates by convection on shut down and, in this way, cools the shaft bearings 3 and 4.

I claim:

1. A regenerative gas turbine engine provided with a reservoir for oil for cooling the bearing parts of said turbine engine upon shutdown of the said engine, said turbine having turbine shaft bearings supported in a housing which forms a part of a lubricating system, oilways leading to and from said bearings, said oil reservoir surmounting said housing, surrounded by a stepped cylindrical casting, and the upper part of the larger end of this stepped casting is separated from the remainder of the casting by a substantially horizontal cordal wall to form the oil reservoir, said reservoir becoming filled with oil from one of said oilways during operation of the engines, an overflow for said oil in said reservoir, said oil in said reservoir draining onto the said shaft bearings for cooling the same upon a shutdown of the engine.

2. A regenerative gas turbine engine according to claim 1, in which an annular space between the inner diameter of the smaller end of the stepped casting and the outer diameter of the bearing housing is fed with oil through an extension of an oilway of the bearing housing, and the reservoir receives oil from the annular space.

3. A regenerative gas turbine engine according to claim 2, in which the oilway extension is fitted with a spring-loaded non-return valve which causes oil to be retained in the reservoir on shut down.

4. A regenerative gas turbine engine according to claim 1 wherein an auxiliary gearbox suspended beneath one end of the bearing housing receives oil through drillings and an oilway in the lower part of the bearing housing.

* * * * *

UNITED STATES PATENT OFFICE
CERTIFICATE OF CORRECTION

Patent No. 3,692,146           Dated September 19, 1972

Inventor(s) LAWRENCE BUTLER

It is certified that error appears in the above-identified patent and that said Letters Patent are hereby corrected as shown below:

[30]     Foreign Application Priority Data
    February 19, 1970        Great Britain      7701/70

Signed and sealed this 13th day of February 1973.

(SEAL)
Attest:

EDWARD M. FLETCHER, JR.            ROBERT GOTTSCHALK
Attesting Officer                  Commissioner of Patents